United States Patent [19]

Jones

[11] Patent Number: 4,961,473

[45] Date of Patent: Oct. 9, 1990

[54] KIT FOR CONVERTING A HAND-POWERED WHEELCHAIR TO AN ELECTRIC MOTOR-POWER WHEELCHAIR

[76] Inventor: George C. Jones, 431 Branding Iron, Houston, Tex. 77060

[21] Appl. No.: 302,905

[22] Filed: Jan. 30, 1989

[51] Int. Cl.[5] .................................................. B60K 1/02

[52] U.S. Cl. ..................................... 180/65.1; 180/6.5; 180/907; 280/304.1; 297/DIG. 4

[58] Field of Search ...................... 180/907, 65.1, 65.2, 180/221, 6.5; 65.6; 188/2F; 280/42, 304.1, 657; 297/DIG. 4

[56] References Cited

U.S. PATENT DOCUMENTS

| | | | |
|---|---|---|---|
| 2,798,565 | 7/1957 | Rosenthal et al. | 180/907 X |
| 3,786,887 | 1/1974 | Rosenthal et al. | 180/907 X |
| 3,955,639 | 5/1976 | Cragg | 180/907 X |
| 4,592,570 | 6/1986 | Nasgiri | 297/DIG. 4 X |
| 4,759,418 | 7/1988 | Goldenfeld et al. | 180/907 X |
| 4,773,494 | 9/1988 | Anderson | 180/907 X |
| 4,805,711 | 2/1989 | Lautzenhiser | 180/907 X |

FOREIGN PATENT DOCUMENTS

| | | | |
|---|---|---|---|
| 2248678 | 5/1975 | France | 180/907 |

OTHER PUBLICATIONS

Advertisement from Home Care Apr. 1988 Issue.

*Primary Examiner*—Charles A. Marmor
*Assistant Examiner*—Brian L. Johnson
*Attorney, Agent, or Firm*—Vaden, Eickenroht, Thompson & Boulware

[57] ABSTRACT

A kit for converting a hand-powered wheelchair to an electric motor-powered wheelchair is disclosed. The kit includes a pair of DC electric motors, each motor being connected to a drive wheel for rotating the drive wheel. The motors are mounted on the supporting frame of the chair for pivotal movement relative to the frame between a first position with the drive wheel adjacent to but spaced from the rim of one of the large diameter rear wheels of the chair and a second position with the drive wheels in engagement with the wheels so that rotation of the drive wheels will rotate the large wheels and move the chair. Levers are mounted on the frame for moving the motors between the first and second positions. A battery supplies power to the motors through switches that control the flow of electricity to the motors.

7 Claims, 3 Drawing Sheets

FIG. 3
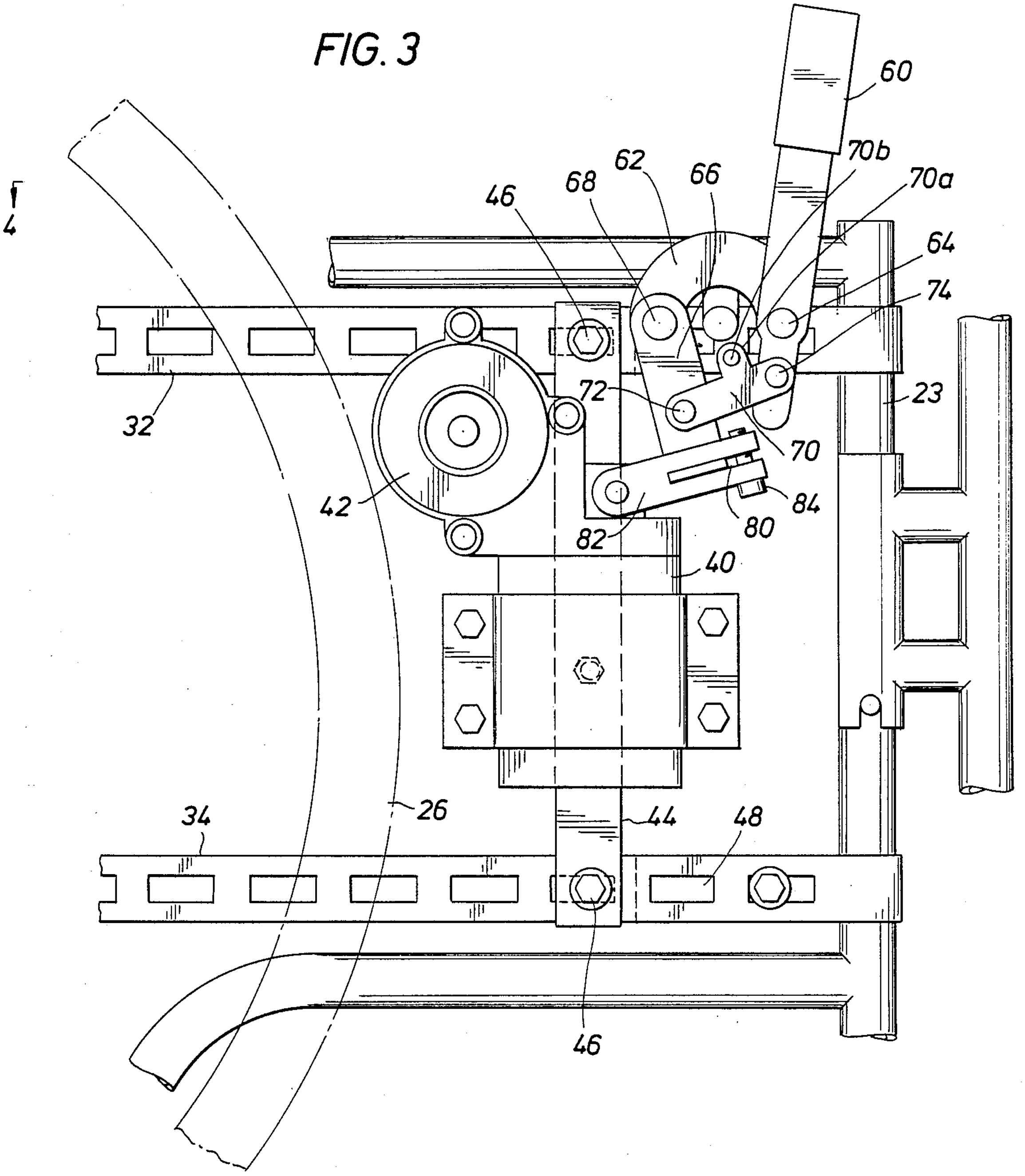
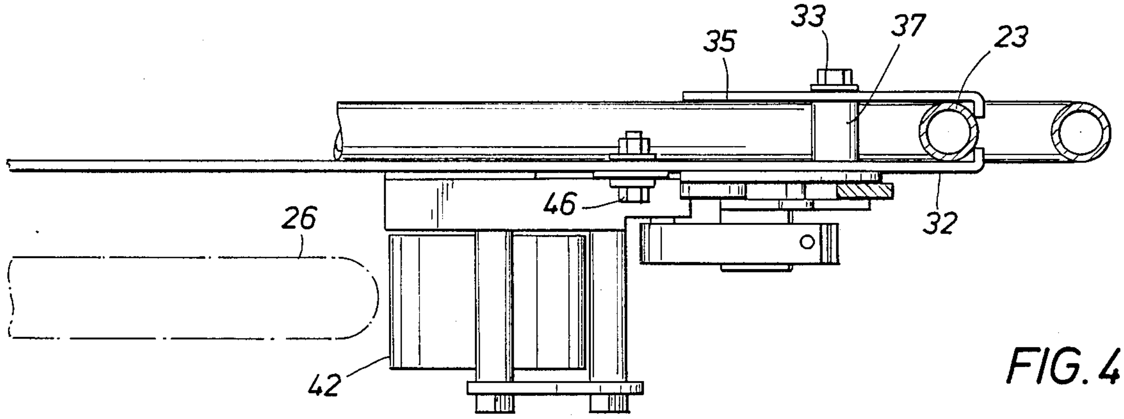
FIG. 4

FIG. 5
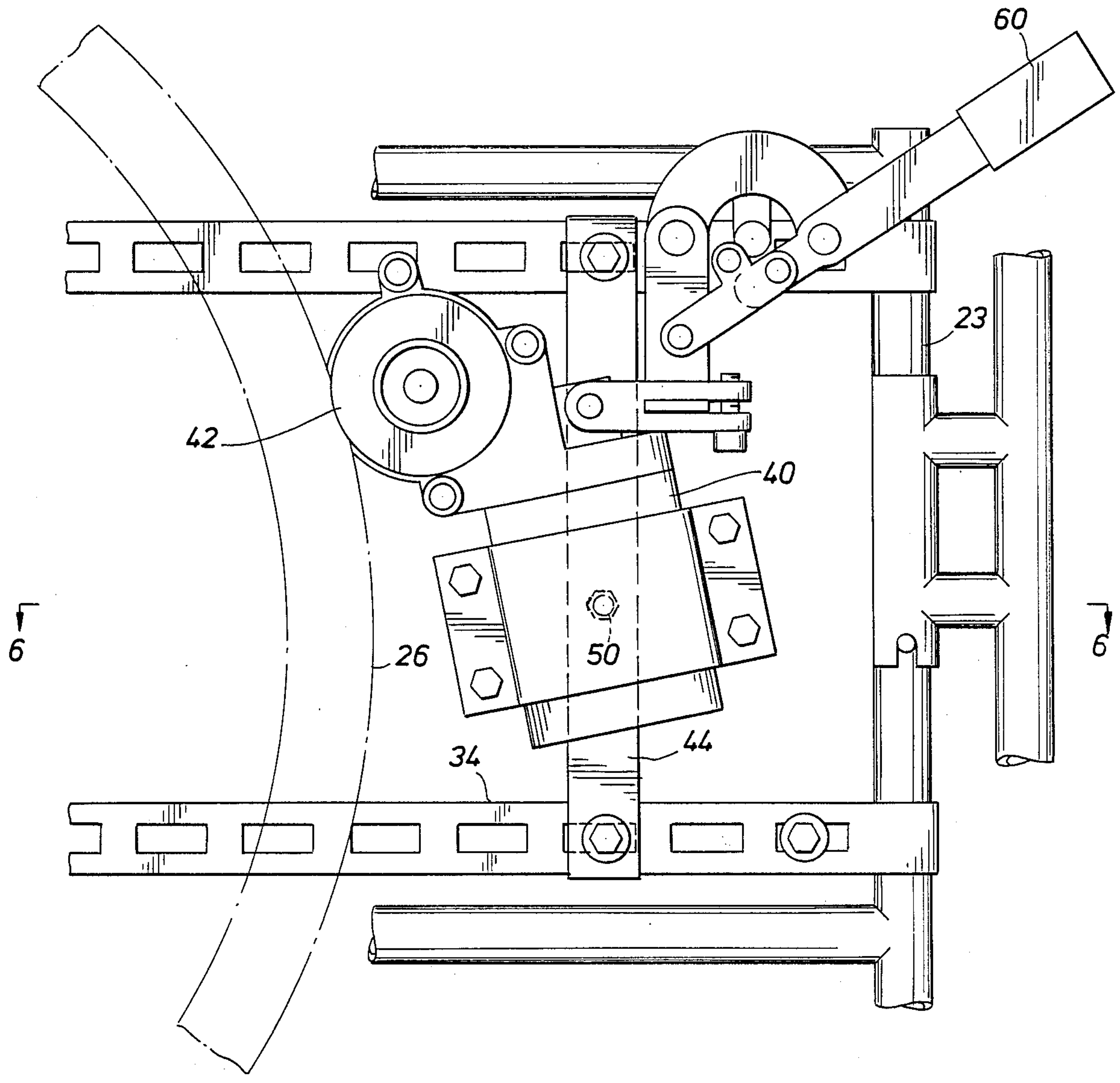
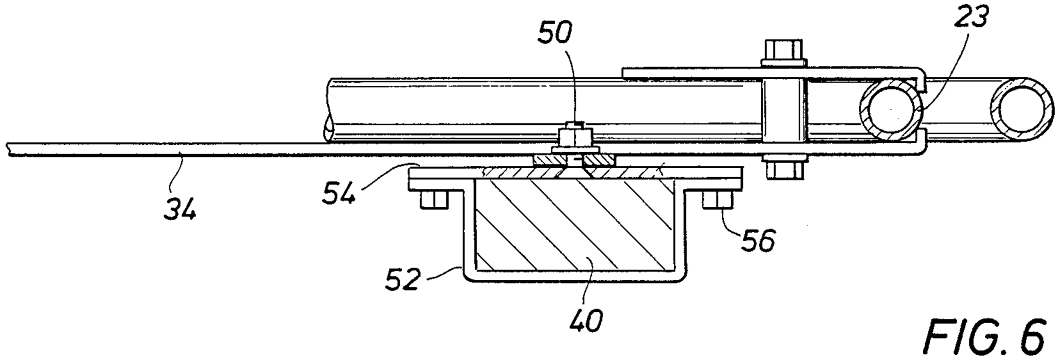
FIG. 6

KIT FOR CONVERTING A HAND-POWERED WHEELCHAIR TO AN ELECTRIC MOTOR-POWER WHEELCHAIR

This invention relates to wheelchairs, generally, and in particular to a kit for converting a hand-powered wheelchair to a motor-powered wheelchair.

There is a need for a kit that can be installed on a hand-powered wheelchair to allow the wheelchair to be operated by hand or by motor power.

It is an object of this invention to provide such a kit.

It is a further object of this invention to provide such a kit that can be quickly and easily installed on a wheelchair and that will allow the wheelchair to be folded up for storage purposes with the kit still in place on the wheelchair, requiring only the removal of the battery that provides power to the motors of the kit.

These and other objects, advantages, and features of this invention will be apparent to those skilled in the art from a consideration of this specification, including the attached drawings and appended claims.

IN THE DRAWINGS

FIG. 3 is a side view of the wheelchair of FIG. 1 on an enlarged scale;

FIG. 4 is a view looking in the direction of the arrows 4—4 of FIG. 3;

FIG. 5 is a view similar to that of FIG. 3 showing the drive wheel in engagement with the back wheel of the wheelchair so that rotation of the drive wheel will cause the rear wheel to rotate and move the chair;

FIG. 6 is a view taken along line 6—6 of FIG. 5.

Figure 1:
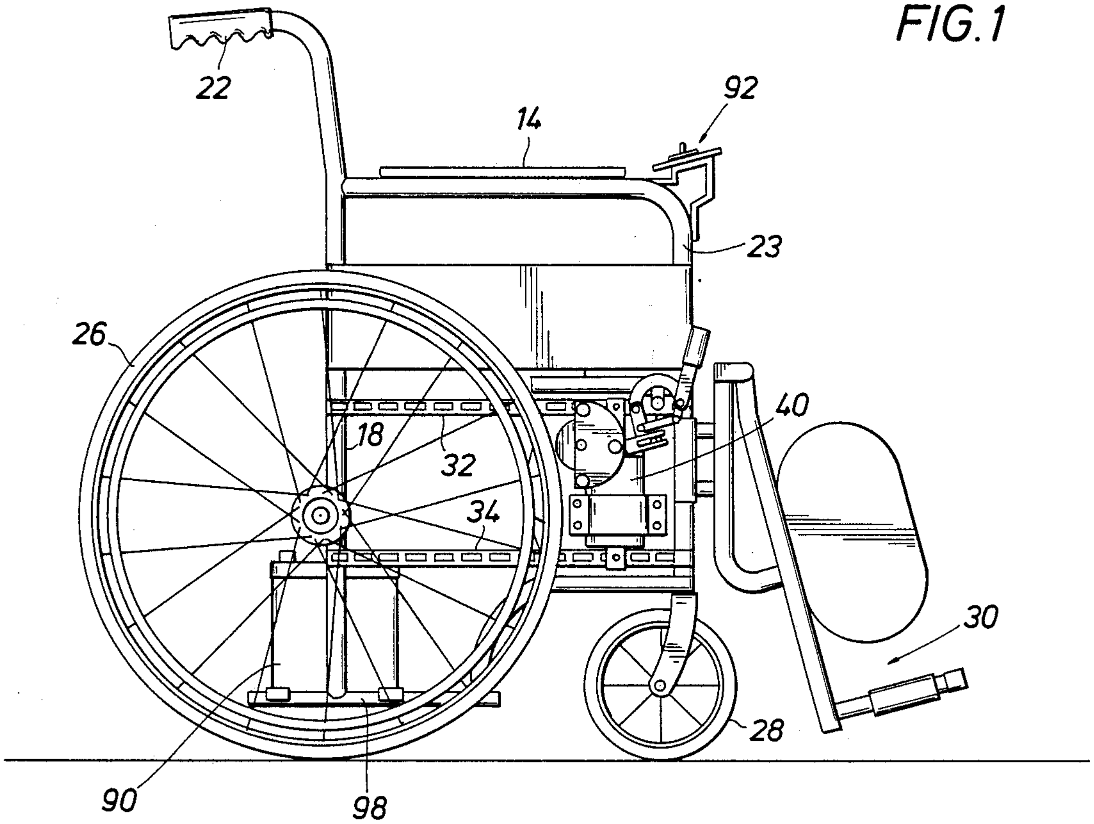
FIG. 1 is a side view of a typical wheelchair with the kit of this invention installed.

The wheelchair shown in the drawings is conventional. It includes a seat having back 12 and arm rest 14, only one of which is seen in the drawings in FIG. 1. The seat is supported by two rear tubular members 16 and 18 that extend upwardly along each side of the back of the seat and then curve rearwardly to provide handlebars 20 and 22 that are used by an attendant to guide and push the wheelchair along in the conventional manner. Arm rests 14 are formed by two spaced tubular members that extend horizontally to provide the arm rests then curve downwardly to provide the front supporting members for the seat of the chair. Only front supporting member 23 is shown in the drawings.

Large diameter wheels 24 and 26 are connected to rear support members 16 and 18 to support the rear of the chair above the ground. The front support members are attached to small diameter caster-like wheels 28 that support the front of the chair. These wheels can pivot 360° to give the chair maneuverability.

The chair is also provided with a foot rest generally indicated by the number 30.

Extending between front and rear support members 18 and 23 on each side of the chair are mounting bars or lateral support members 32 and 34. Only the lateral support members extending between tubular support members 18 and 23 are shown in the drawings. The lateral support members are clamped to the vertical support members as shown in FIG. 4 by bolt 33 that pulls support member 34 and clamp arm 35 against spacer 37 to clamp the lateral support members to the vertical.

Figure 2:
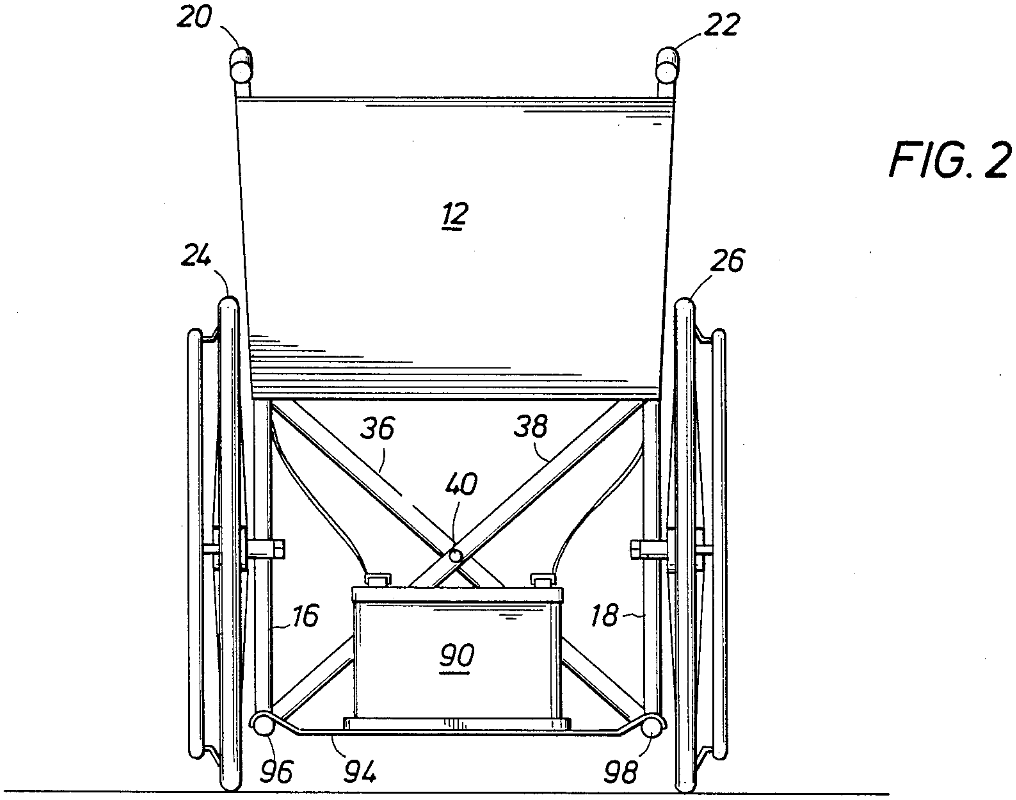
FIG. 2 is a rear view of the chair of FIG. 1.

Also providing support for the chair are members 36 and 38, shown in FIG. 2, that extend diagonally from opposite sides of the chair upwardly to the other side of the chair as shown. The two members are connected together by pivot pin 40 and they are connected to the opposite sides of the chair with pivot pins that allow the chair to be folded up in the conventional manner.

The kit of this invention includes a pair of motor drive assemblies mounted on opposite sides of the chair, only one of which is shown in the drawings. The assembly shown includes DC motor 40. The motor has an output shaft upon which is mounted a worm gear that drives a spur gear which in turn rotates drive wheel 42. The output shaft, worm gear, and spur gear are conventional and are not shown. The motor drive assembly is mounted on support member 44 that extends between lateral support members 32 and 34. Support member 44 is attached at each end to lateral support members 32 and 34 by bolts that extend through slots 48 provided in the lateral support members. These slots 48 allow the motor drive wheel assembly to be adjusted to the proper distance from wheel 26 to insure that the drive wheel engages the wheel with the proper force when it is moved to the position shown in FIG. 5.

Means are provided for moving the drive wheel into and out of engagement with rear wheel 26. In the embodiment shown, motor 40 is mounted on support member 44 by bolt 50 as shown in FIG. 6. This allows the motor to pivot around the longitudinal axis of the bolt. The motor is supported by U-shaped bracket 52 that is connected to mounting plate 54 by bolts 56. Means are provided to pivot the motor around the axis of bolt 50. In the embodiment shown, handle 60 is mounted on arcuate member 62 to pivot around the axis of pin 64. Link 66 is connected to arcuate member 62 by pin 68 so that link 66 can pivot around the axis of pin 68. Link 66 is connected to handle 60 below pin 64 by link 70 that is connected to link 66 and the handle by pins 72 and 74, respectively. The lower end of link 66 is L-shaped and extends into slot 80 of link 82. It is clamped in the slot by machine screw 84. This allows the linkage to be adjusted by loosening machine screw 84 and positioning the lower end of link 66 in the slot in the position that will provide the desired movement.

Movement occurs when handle 60 is moved forwardly causing link 70 to move link 66 rearwardly and downwardly to the position shown in FIG. 5, which in turn will cause the motor assembly to pivot until drive wheel 42 is in proper engagement with large wheel 26. To keep the handle from going much over center in this position, link 70 is provided with lug **70*a* in which pin 70*b* is located that extends beyond the plane of the link and prevents the lower end of handle 60 from going more than slightly beyond its in-line position with link 70**, as shown in FIG. 5.

When the drive wheels of the motor assemblies are in engagement with large wheels 24 and 26, the person in the wheelchair can provide power from battery 90 to the motor assemblies through switches 92. Each wheel can be individually controlled to rotate to move the chair forward or backward or power can be supplied to only one wheel to change the direction of movement.

Battery 90 is supported by battery tray 94, which in turn is supported by horizontal arms 96 and 98. The arms extend between and are connected to front and back seat support members.

With the kit of this invention, only the battery and the battery tray have to be removed before the chair can be folded up for storage.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A kit for converting a hand-powered wheelchair to an electric motor-powered wheelchair, said wheelchair having a seat, a supporting frame for the seat including a pair of spaced, generally vertical, frame members on each side of the seat, a pair of large diameter wheels supporting the rear of the frame, and a pair of small diameter wheels supporting the front of the frame, said small diameter wheels being connected to the frame for pivotal movement relative to the frame around a vertical axis to allow the direction of travel of the chair to be changed, said kit comprising a pair of DC electric motors, each motor having an output shaft and a drive wheel mounted on the output shaft, means for mounting each electric motor on the supporting frame for pivotal movement relative to the frame between a first position with the drive wheel adjacent to but spaced from a rim of one of the large diameter wheels and a second position with the drive wheel in engagement with a rim of the wheel so that rotation of the drive wheel will rotate the large wheel, said means for mounting each motor includes two mounting bars and means for attaching the mounting bars in spaced parallel position between the vertical frame members, and a motor support member for attaching to the mounting bars to support a motor and a drive wheel, a pair of handles for mounting on the frame for pivotal movement around fixed axes, said handles having portions extending upwardly from the axes of rotation to be manually engaged for rotating the handles about their axes of rotation and lower portions extending downwardly from the axes, and link means for connecting to the lower portion of each handle and to a motor for moving the motor between the first and second positions with the handle and for holding the motors in the second position until moved therefrom by the handle, a battery tray for mounting on the frame to support a storage battery, and switch means for controlling the flow of electricity to the motors when the motors are in the second position to cause the wheelchair to move.

2. The kit of claim 1 including for clamping the mounting bars in spaced parallel position between the vertical frame members a motor support member for means for adjusting the distance between the motor support member and the rim of a large wheel as required for the drive wheel to properly engage the rim when the motor is in the second position.

3. The kit of claim 1 in which the means for mounting the motor includes a motor mounting plate attached to the frame for pivotal movement and in which the link means includes means for moving the motors between the first and second positions including a first link extending generally in the direction of movement of the motor between the first and second positions and having one end attached to the motor mounting plate for pivotal movement relative to the plate, a second link extending generally in a direction transverse the direction of the first link, said second link having one end connected to the other end of the first link and the other end of the second link connected to a frame member for pivotal movement only, a third link having one end pivotally connected to the second link between the ends of the second link and the other end of the third link pivotally connected to the lower portion of the handle whereby pivotal movement of the handle will move an electric motor between the first and second positions.

4. The kit of claim 3 in which the longitudinal axis of the handle passes through and slightly beyond an aligned position with the longitudinal axis of the third link to hold the motor in the second position.

5. The kit of claim 4 further provided with means for limiting the distance the handle can move past the aligned position.

6. The kit of claim 3 in which the means connecting the first and second links holds the longitudinal axes of the first and second links at a fixed angle.

7. The kit of claim 6 in which the means connecting the first and second links includes means for adjusting the location of the connection along the axis of the first link to adjust the force exerted on the rim of the large diameter wheel by the drive wheel.

* * * * *